(No Model.)
W. H. EDSALL & F. L. LATHROP.
CENTRAL DRAFT LAMP.
No. 545,462. Patented Sept. 3, 1895.
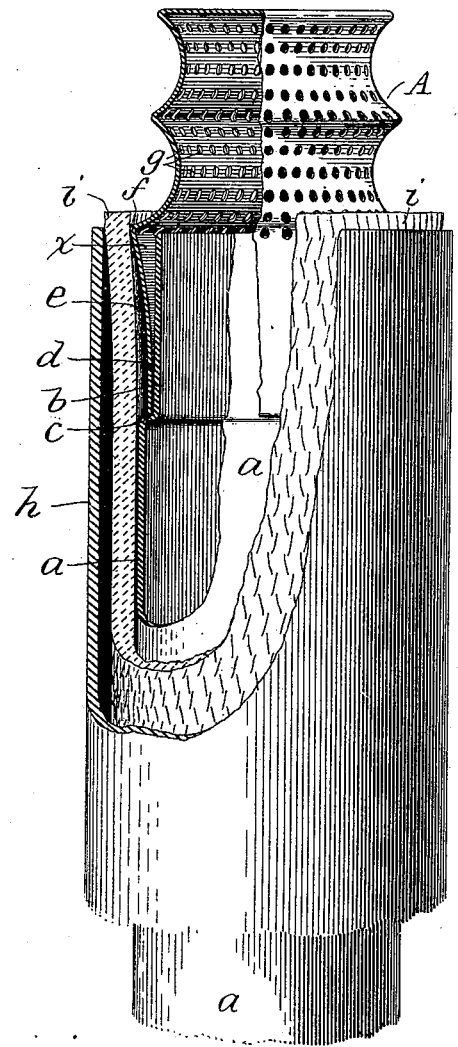
WITNESSES:
Wm B. Shephard.
Charles E. Smith
INVENTORS
William H. Edsall,
Frank L. Lathrop,
BY
Briesen & Knauth
ATTORNEYS

UNITED STATES PATENT OFFICE.

WILLIAM H. EDSALL AND FRANK L. LATHROP, OF BROOKLYN, ASSIGNORS TO THE H. L. JUDD & COMPANY, OF NEW YORK, N. Y.

CENTRAL-DRAFT LAMP.

SPECIFICATION forming part of Letters Patent No. 545,462, dated September 3, 1895.

Application filed June 20, 1894. Serial No. 515,119. (No model.)

*To all whom it may concern:*

Be it known that we, WILLIAM H. EDSALL and FRANK L. LATHROP, of Brooklyn, Kings county, and State of New York, have invented new and useful Improvements in Central-Draft Lamps, of which the following is such a full, clear, and exact description as to enable any person skilled in the art to which it appertains to make and use the same.

This invention relates to that class of lamps known as "central-draft;" and it consists in the novel arrangement and combination of parts hereinafter described and claimed.

In the drawing the figure represents a side view, with portions broken away, of a sufficient number of parts of a central-draft lamp to illustrate our invention.

In lamps of this character heretofore constructed there have been found great difficulties due to what is known as "weeping"—that is to say, when the upper end of the wick is raised to a level higher than the top of the draft-tube the capillary attraction of the wick causes the oil to be raised to the perforations in the spreader. The oil in this manner passes through the perforations in the spreader and runs down through the draft-tube to the stand on which the lamp rests.

The object of our invention is to overcome these and other defects, which will be hereinafter pointed out, and to produce a more efficient lamp at little cost.

In the drawing, $a$ represents the draft-tube of a central-draft lamp, the lower end of which is in open communication with the atmosphere. The upper end of this central-draft tube $a$ is contracted, as shown at $b$, so as to form a shoulder $c$ for supporting a spreader A, which is preferably struck up from a single piece, but may be constructed of several pieces united to form practically one piece. The lower portion $d$ of the spreader A is imperforate and of such a size as to fit snugly upon the contracted portion $b$ of the draft-tube $a$, so as to form an inclosed circumferential groove or recess $e$ above the shoulder $c$ when the spreader is in place upon the draft-tube and the wick in position for use, the walls of the recess being formed by the wick on one side and the spreader on the other side. The spreader A gradually widens from the lower edge to a point just below the upper edge of the wick when the lamp is in use, so as to form an outwardly-extending portion $f$, larger in diameter than the largest diameter of the draft-tube, and so as to leave between the upper edge of the draft-tube $a$ and said outwardly-extending portion of the spreader a small circumferential chamber or recess $x$ for purposes which will be hereinafter specified. At and above this outwardly-extending portion $f$ of the spreader A is a series of perforations $g$ for the admission of air from the draft-tube, which is projected directly against the flame upon its exit therefrom. This perforated portion of the spreader may be of any desired formation, but is preferably of the form shown in the drawing.

Surrounding and concentric with the draft-tube $a$ is an outer tube $h$, between which tube and the draft-tube the wick $i$ is contained. The outer tube $h$ extends to the height of the outwardly-extending portion of the spreader, and the space between the said tube $h$ and the draft-tube is greater than the thickness of the wick, so that the wick is free to move between the tubes with little frictional contact until it reaches the outwardly-extending portion $f$ of the spreader, when it is forced outward thereby, reaching contact with the outer tube $h$, thereby spreading out the wick and causing any unevenness that might be contained therein to be smoothed out.

In operation the parts are supposed to be in the position shown in the drawing when the wick $i$, which communicates with the oil-fount, (not shown,) by capillary attraction conveys the oil to the point of ignition, and the surplus oil is conveyed through the perforations $g$ in the spreader to the chamber $x$ between the spreader and the draft-tube. The oil runs from this chamber to the circumferential groove $e$, a portion of it being retained therein by the wick and the remainder running back into the oil-fount. By this means it will be observed that the upper end of the wick is kept continually well saturated with oil, whereby the wick can at once be turned to the height desired and the lamp lighted to at once give forth the full extent of light desired without the necessity of waiting for it to gradually attain the full extent of the light, as in lamps heretofore made.

By constructing the draft-tube *a* with an upper contracted portion and providing the spreader with a tapering portion to fit the contracted end of the draft-tube, so that only the outwardly-extending portion *f* of the spreader is brought in contact with the wick, we are enabled to dispense with a positive locking means between the draft-tube and spreader, as has been found necessary heretofore in lamps where the spreader was placed on the outside of the draft-tube.

In central-draft lamps it is often necessary to remove the spreader in order to trim the wick and for other purposes, and unless great care was exercised in lamps heretofore made in replacing the spreader it was found that the perforations on one side of the spreader would be brought nearer to the flame than those on the opposite side, in which case the lamp would be caused to burn irregularly and frequently to smoke. By our invention the spreader is caused by the enlarged portion *f* thereof to exactly center itself by the wick, thus overcoming the objections pointed out. It will also be observed that the air conveyed through the draft-tube is suddenly projected to and allowed to expand in the larger chamber of the spreader, causing a large area of flame to be produced. At the same time the air on the outside and inside of the flame is equalized, rendering a steady and brilliant light.

Having described our invention, what we claim, and desire to secure by Letters Patent, is—

1. In a lamp, the combination of a draft tube having the entire portion which forms the upper end thereof contracted for a considerable portion of its length, and a removable spreader perforated at its upper portion and having an imperforate depending portion extending therefrom, the lower end of which depending portion is smaller in diameter than the largest diameter of the draft tube and which is adapted to fit over and be supported on the contracted portion of the draft tube, whereby an inclosed circumferential groove or recess is formed near the lower end of the spreader the walls of which recess are formed on one side by the spreader and on the other by the wick, substantially as and for the purposes specified.

2. In a lamp, the combination of a draft tube, a removable spreader adapted to fit over the outside of and be supported thereby, said spreader having an outwardly extending perforated portion, closed at the top and larger in diameter than the largest diameter of the draft tube and located so that it will extend below the edge of the wick when the lamp is in condition for use, the upper end of said draft tube extending substantially to the height of the outwardly extending portion of the spreader, substantially as and for the purposes specified.

3. In a lamp, the combination of a draft tube, a removable spreader adapted to fit over the outside of and be supported thereby, said spreader having an outwardly extending perforated portion, larger in diameter than the largest diameter of the draft tube and located so that it will extend below the edge of the wick when the lamp is in condition for use, an imperforate depending portion extending from said outwardly extending perforated portion which imperforate depending portion is gradually reduced in diameter toward the lower end thereof, and an outer tube surrounding and concentric to said draft tube, the outer tube extending to the height of the outwardly extending portion of the spreader, substantially as and for the purposes specified.

4. In a central draft lamp, the combination of an outer tube, a draft tube contained therein, having its upper end reduced, a removable, covered, perforated spreader having circumferential reductions of smaller diameter than the internal diameter of the reduced portion of the draft tube and circumferential ridges, the lowermost of which is larger than the circumference of the draft tube, an imperforate depending portion integral therewith and of gradually reduced circumference to its lower end, said spreader being adapted to fit over and engage the draft tube, as and for the purposes specified.

WILLIAM H. EDSALL.
FRANK L. LATHROP.

Witnesses:
HARRY M. TURK,
CHARLES E. SMITH.